United States Patent [19]
Smith et al.

[11] 4,424,337
[45] Jan. 3, 1984

[54] POLYISOPHTHALATE AND COPOLYMERS THEREOF HAVING REDUCED CYCLIC DIMER CONTENT, AND A PROCESS FOR MAKING THE SAME

[75] Inventors: Richard R. Smith, Cuyahoga Falls; David W. Sartorelli, Akron, both of Ohio

[73] Assignee: The Goodyear Tire & Rubber Company, Akron, Ohio

[21] Appl. No.: 415,304

[22] Filed: Sep. 7, 1982

[51] Int. Cl.$^3$ .............................................. C08G 63/22
[52] U.S. Cl. .................................... 528/274; 525/437; 528/295.3; 528/298
[58] Field of Search .................... 528/298, 274, 295.3; 525/437

[56] References Cited

U.S. PATENT DOCUMENTS 3,576,774  4/1971  Myers et al. ................... 528/302 X
4,161,579  7/1979  Edelman et al. ............... 528/298 X
4,403,090  9/1983  Smith ............................ 528/302 X Primary Examiner—Lucille M. Phynes
Attorney, Agent, or Firm—Alvin T. Rockhill

[57] ABSTRACT

A polyisophthalate such as poly(ethylene isophthalate) and copolymers thereof having high intrinsic viscosities as well as reduced ring dimer of ethylene isophthalate, and a process for making the same. A protonic acid catalyst is utilized along with intrinsic viscosity modifying agents during preparation of the polyisophthalate. The polymers produced have very high clarity, improved oxygen and carbon dioxide barrier resistance, high glass transition temperature, as well as increased molecular weights. They are thus suitable for use as materials in packaging or forming containers, such as bottles.

25 Claims, No Drawings

POLYISOPHTHALATE AND COPOLYMERS THEREOF HAVING REDUCED CYCLIC DIMER CONTENT, AND A PROCESS FOR MAKING THE SAME

TECHNICAL FIELD

The present invention relates to polyisophthalates, as well as to copolymers thereof, having reduced ring dimer of ethylene isophthalate as well as improved barrier resistance and higher molecular weights through the utilization of protonic acid catalysts and intrinsic viscosity modifying agents.

BACKGROUND ART

The synthesis of polyisophthalates and copolymers thereof is accompanied by the formation of large amounts of crystalline ring dimer of ethylene isophthalate. Such dimers create problems during polyethylene isophthalate preparation by subliming during the latter stages of polymerization when the molten polymer is subjected to vacuum. Cyclic dimer thereof deposits on the wall of the reaction vessel and also plugs vacuum lines. Naturally, processing costs are thereby greatly increased due to necessity of cleaning the vessel and the reaction lines. Further, the theoretical polymer yield is reduced by the amount corresponding to the amount of cyclic dimer formed, which can be as high as 15 percent, as observed in an article by C. E. Berr, J. Polymer Science, 15, 591 (1955). Also, the final polymer product is contaminated with the high melting cyclic dimer. Hence, films or molded articles produced from polyisophthalates or copolymers thereof contain opaque, white specs of the unmelted by-product. The non-homogeneity of such films and articles severely detracts from their appearance.

Heretofore, polymerizations and copolymerizations involving polyisophthalate have been carried out using standard, well known polycondensation catalysts to increase the rate of polymerization to an acceptable level. Commonly, these catalysts are metallic compounds such as antimony trioxide and various titanium compounds such as alkyl titanates.

The present invention utilizes non-metallic, protonic acid catalysts as well as intrinsic viscosity modifying agents which, as noted, results in polymers having reduced cyclic dimer by-product, increased intrinsic viscosity, and improved barrier properties.

The known art has long recognized the problem of cyclic dimer formation, as for example, C. E. Berr., Supra. This article does not, however, teach the use of protonic acid catalysts in conjunction with chain-extending agents to reduce the cyclic dimer content.

U.S. Pat. No. 2,965,613 to Milone, et al, relates to copolymers of ethylene terephthalate and ethylene isophthalate and is not pertinent since there is no suggestion of reducing the amount of cyclic dimer formed in the final polymer other than to prepare copolymers containing high amounts of terephthalate units.

U.S. Pat. Nos. 4,234,708 and 4,264,751, although relating to the use of chain-branching agents do not relate to polyisophthalates having low cyclic dimer content and prepared utilizing protonic acids.

Reference to the use of acids as polycondensation catalysts can be found in *Organic Chemistry of Synthetic High Polymers*, Lenz, R. W., John Wiley, New York, New York, 1967, pages 81–91, and *Textbook of Polymer Science*, 2nd ed., Billmeyer, F. W., Wiley-Interscience, New York, New York, 1971, pages 264–267. While the authors generally describe the use of acids, they do not disclose the use of protonic acid catalysts to reduce the formation of cyclic dimer in polymerizations involving isophthalate-based polymers.

DISCLOSURE OF INVENTION

Accordingly, it is an aspect of the present invention to provide, as well as a process for making, a polyisophthalate, such as poly(ethylene isophthalate), and copolymers thereof having a low ethylene isophthalate ring dimer content.

It is another aspect of the present invention to provide, as well as a process for making, polyisophthalate, and copolymers thereof, in which yields per batch are increased.

It is still another aspect of the present invention to provide, as well as the process for making, polyisophthalate, and copolymers thereof, as above, having increased intrinsic viscosities or molecular weights, alternatively having improved clarity, alternatively having improved glass transition temperatures, and alternatively having improved barrier resistant properties to oxygen and carbon dioxide.

It is still a further aspect of the present invention to provide, as well as the process for making, polyisophthalate, and copolymers thereof, as above, utilizing protonic acids and intrinsic viscosity modifying agents.

Yet another aspect of the present invention is to provide, as well as the process for making, polyisophthalate, and copolymers thereof, as above, which can be utilized in making containers, packaging material, and the like, for example, bottles.

These and other aspects of the present invention will become more apparent from the following description which sets forth the best mode and preferred embodiments of the invention.

In general, a process for preparing polyisophthalate or a copolymer thereof having low amount of ring dimer of ethylene isophthalate, comprises the steps of: reacting an isophthalic compound with a glycol, said isophthalic compound selected from the group consisting of isophthalic acid, an alkyl ester of isophthalic acid having from 10 to 20 carbon atoms, and combinations thereof, said glycol being ethylene glycol and containing from 0 to 50 mole percent of one or more compounds selected from the group consisting of a glycol having from 3 to 12 carbon atoms, a glycol ether having from 4 to 12 carbon atoms, and combinations thereof; said copolymer being the reaction product of said isophthalic compound, said glycol, and up to 50 mole percent of a dicarboxylic acid or ester thereof having from 4 to 40 carbon atoms based upon said isophthalic compound and said dicarboxylic acid or said ester thereof, said dicarboxylic acid or ester thereof being other than said isophthalic compound; adding a protonic acid catalyst to said reaction; and adding an intrinsic viscosity modifying agent to said reaction to produce said isophthalic polymer or said copolymer thereof, having reduced cyclic dimer content.

In general, a polyisophthalate or copolymers thereof having a low content of ring dimer of ethylene isophthalate, comprises: the polyisophthalate being the reaction product of an isophthalic compound and a diol having from 2 to 12 carbon atoms, said isophthalic compound selected from the group consisting of isophthalic acid, an alkyl ester of isophthalic acid having from 10 to 20 carbon atoms, and combinations thereof, said diol being ethylene glycol and containing from 0 to 50 mole percent of one or more compounds selected from the group consisting of a glycol having from 3 to 12 carbon atoms, a glycol ether having from 4 to 12 carbon atoms, and combinations thereof; said copolymer being the reaction product of said isophthalic compound, said diol, and up to 50 mole percent of a dicarboxylic acid or ester thereof having from 4 to 40 carbon atoms based upon said isophthalic compound and said dicarboxylic acid or said ester thereof, said dicarboxylic acid or ester thereof being other than said isophthalic compound; said polyisophthalate or copolymer formed in the presence of a protonic acid catalyst having a p$K_a$ of 2.5 or less; and an intrinsic viscosity modifying agent so that said isophthalic polymer or said copolymer thereof has a dimer content of 5 weight percent or less.

BEST MODE FOR CARRYING OUT THE INVENTION

The present invention relates to providing polyisophthalate homopolymers or copolymers thereof in which cyclic dimerization has been greatly reduced. Cyclic dimer generally refers to the cyclization of ethylene glycol and isophthalic acid to form the following ring structure:

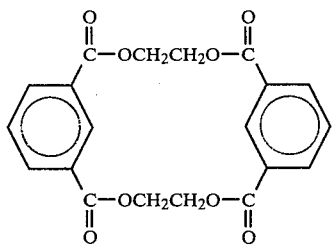

This ring structure contains two units of ethylene isophthalate (hence, the name cyclic dimer) and is a by-product of the polyesterification reaction of ethylene glycol with isophthalic acid or of the transesterification reaction of ethylene glycol with isophthalate esters such as dimethyl- or diethylisophthalate. Esterification or transesterification of a glycol and a dicarboxylic acid or ester thereof is the first step in many conventional processes for making polyesters. The use of selected protonic acids has unexpectedly been found to result inisophthalate polymers and copolymers containing greatly reduced amounts of cyclic dimer by-product. Further, line plugging and material loss has been significantly reduced.

The polyester of the present invention is produced by the reaction of an isophthalic compound, that is, isophthalic acid, or esters of isophthalic acid, with ethylene glycol. Additionally, the polyesters of the present invention also relate to copolymers of polyethylene isophthalate. By definition, a copolymer of polyethylene isophthalate is a polyester made from monomers wherein the total quantity of a dicarboxylic compound comprises at least 50 mole percent isophthalic acid or esters thereof having from 10 to 20 carbon atoms and the glycol comprises at least 50 mole percent ethylene glycol or, alternatively, the esters used in the polycondensation reaction comprises at least 50 mole percent ethylene isophthalate. In preparing the polyisophthalate, or copolymers thereof, although isophthalic acid is highly preferred, the alkyl esters of isophthalic acid can be utilized wherein they contain a total of from 10 to 20 carbon atoms with from about 10 to 16 being preferred. Specific examples of isophthalic acid esters include dimethylisophthalate and diethylisophthalate, with these two compounds being preferred.

Preferably, ethylene glycol is utilized so that the end polymer is poly(ethylene isophthalate), hereinafter PEI, a preferred polymer. However, as noted, up to 50 mole percent of one or more glycols having from 3 to 12 carbon atoms can be utilized, so that a polyisophthalate (PI) is formed. It is desired that glycols contain 10 carbon atoms or less and preferably glycols containing a total of 8 carbon atoms or less, especially aliphatic or cycloaliphatic glycols be utilized. Examples of glycols include propylene glycols, such as trimethylene glycol, butylene glycols, such as tetramethylene glycol, neopentyl glycol, 1,4-cyclohexane dimethanol, and the like. Generally, the amount of the non-ethylene glycol utilized is 40 mole percent or less, and preferably 30 mole percent or less.

Another class of diols include the glycol ethers which contain from 4 to 12 carbon atoms, preferably from 4 to 8 carbon atoms, with specific examples including diethylene glycol and 1,4-dihydroxyethoxy benzene.

The isophthalic compound, that is isophthalic acid, or esters thereof, which is reacted with at least 50 mole percent of ethylene glycol can optionally be made with up to 50 mole percent of a dicarboxylic acid or ester thereof, herein defined as a non-isophthalic compound, to form a random or block copolymer. Regardless of whether a PI polymer is made or a copolymer thereof using a non-isophthalic compound, that is a dicarboxylic acid or ester thereof (other than of isophthalic acid or an ester thereof), generally all of the various reactants are added and made in a conventional manner. For example, all polymer-forming reactants are commonly added to the esterification or the transesterification stage, and followed by a polycondensation stage to produce the polyesters of the present invention. Block copolyesters can be produced according to the present invention by conducting the non-isophthalate compound reaction separate from the isophthalate compound reaction and then reacting the two products together in a conventional manner known to the art to obtain said block polyesters. However, random copolyesters are preferred. As also known to the art, random copolymers can be obtained even by adding the nonisophthalic compound at nearly the end of the transesterification or esterification stage.

When a copolymer is made, the dicarboxylic acid or diester thereof has from 4 to 40 carbon atoms and which, as noted, is not an isophthalic compound or ester thereof. Thus, the dicarboxylic acid can be an alkyl dicarboxylic acid or ester thereof, an aryl dicarboxylic acid or ester thereof, an alkyl substituted aryl dicarboxylic acid or ester thereof, or a dimer acid, or an alkali salt of sulfo dialkylisophthalate. The alkyl dicarboxylic acids desirably contain from 4 to 12 carbon atoms. If the acids are aryl or alkyl substituted aryl acids, they desirably contain from 8 or 9, respectively, to about 16 carbon atoms. Typical examples of linear or alkyl dicarboxylic acids include glutaric acid, adipic acid, azelaic acid, sebacic acid, and the like.

Dimer acids can also be used having from about 34 to 40 carbon atoms and preferably 36 carbon atoms. The dimer acid is itself prepared from an unsaturated fatty acid containing 18 carbon atoms such as linoleic and linolenic acid or the monohydric alcohol esters thereof.

The actual preparation and structure of dimerized $C_{18}$ fatty acids are described in J.A.S.C. 66, 84 (1944) and U.S. Pat. No. 2,347,562, both of which are fully incorporated herein by reference. Several different grades of dimer acid are available from commercial sources and these differ from each other primarily in the amount of monobasic and trimer acid fractions and the degree of unsaturation. It is preferred, for purposes of this invention, that the dimer acid be substantially free of the monobasic and trimer acids fractions, that is less than 8 percent by weight, and essentially completely saturated, and be added after the transesterification reaction, that is, at the condensation stage. Two different grades of dimer acid, which are useful in preparing the copolyesters herein described and meet the above requirements are available from Emery Industries, Inc. under the tradename Empol 1010 dimer acid typically containing 97 percent dimer acid, 3 percent trimer acid, and essentially no monobasic acids and extremely low saturation, and Empol 1014 typically containing 95 percent, 4 percent, and 1 percent of dimer, trimer, and monobasic acids, respectively.

Typical examples of non-isophthalic aryl acids include terephthalic acid, orthophthalic acid, naphthalic acids, for example, 2,6-naphthalene dicarboxylic acid, and the like. Specific examples of alkyl substituted aryl acids include the various isomers of dimethylphthalic acid such as dimethylorthophthalic acid and dimethylterephthalic acid, the various isomers of diethylphthalic acid such as diethylorthophthalic acid and diethylterephthalic acid, the various isomers of dimethylnaphthalic acid such as 3,7-dimethyl-2,6-naphthalene dicarboxylic acid and 2,5-dimethyl-1,6-naphthalene dicarboxylic acid, and the various isomers of diethylnaphthalene dicarboxylic acid, and the like. Generally, terephthalic acid is preferred.

It is well known to those skilled in the art, in lieu of the various dicarboxylic acids, the various diesters thereof can be utilized. Thus, esters of alkyl dicarboxylic acids containing a total of from 6 to about 20 carbon atoms, esters of aryl dicarboxylic acids having from about 10 to about 20 carbon atoms as well as esters of alkyl substituted aryl dicarboxylic containing from about 11 to about 20 carbon atoms can be utilized. As previously noted, esters of isophthalic acid or substituted isophthalic acid are not within the definition of an ester of a dicarboxylic acid since they would not form a copolymer. Examples of diesters of alkyl dicarboxylic acids include those made from glutaric acid, adipic acid, azelaic acid or sebacic acid, and the like. Specific examples of various alkyl substituted aryl diesters include 3,6-dimethyl-dimethylterephthalate and 3,7-dimethyl-2,6-dimethylnaphthalene dicarboxylate, and the like. Typical examples of diesters of aryl dicarboxylic acids include the various isomers of dimethylphthalate such as dimethylterephthalate, a preferred ester, the various isomers of diethylnaphthalate, and the like.

Another dicarboxylic acid compound is the alkali salt of sulfodialkylisophthalate where the alkyl group has from 1 to 5 carbon atoms with methyl being highly preferred. Of the alkali compounds, sodium is preferred. Thus, a preferred compound is sodium sulfodimethylisophthalate. These monomers, if used in sufficient quantity, tend to render the copolymer water soluble.

The amount of the dicarboxylic acid or ester thereof (non-isophthalic compound) utilized with the isophthalic compound on a mole basis is generally from about 0 or 0.1 to about 50 mole percent. Desirably, the amount is from about 0 or 0.1 percent to about 30 mole percent, and preferably from about 0 or 0.1 percent to about 20 mole percent.

The total amount of glycols utilized in comparison to the total amount of acids (isophthalic compound and non-isophthalic compound) are conventional. Typically, the mole ratio of the total amount of glycols utilized with the total amounts of acid is approximately 1.05 to 2.5 and approximately 2.2 when esters are used in lieu of acids. Of course, higher or lower ratios can be used as known to the art. Naturally, if the isophthalic compound is an ester and a copolymer is made, the other monomer is also preferably an ester, that is a diester of a dicarboxylic acid. When esters are used as the starting material, the polyester is thereafter added using any conventional ester route as is well known to the art. If the isophthalic compound is an acid, and a copolymer made, the other acid monomer is preferably a dicarboxylic acid (other than isophthalic acid, etc.) and the polyester is made acording to any conventional non-ester route.

The polyesters can be made according to melt polymerization or melt and solid state polymerization. As known to those skilled in the art, polyesters are generally made in three stages. In the first stage (S/1) or esterification stage, the diacid is reacted with the glycol at elevated temperatures and at either atmospheric or at elevated pressures with water or the corresponding alcohol being removed. In the second stage (S/2) or the polycondensation stage, a vacuum is gradually applied, generally additional catalysts are utilized, and additional water along with excess glycol are withdrawn as condensation by-product. The third stage (S/3) commences at the point when full vacuum is reached and the condensation reaction is continued. Various polyesters can be made by such a polymerization including poly(ethylene isophthalate), a preferred polyester resin. Moreover, the process can be modified slightly by reacting the isophthalic acid with the diol and a solution which is a low molecular weight linear polyisophthalate in a manner as set forth in U.S. Pat. No. 4,020,049 to Rinehart, which is hereby fully incorporated with regard to the method of making a polyester resin. Another well known variation utilizes dimethylisophthalate or other diesters which react with ethylene glycol in the presence of a catalyst with a transesterification reaction yielding a bishydroxyethylisophthalate compound. A stabilizer can then be added as well as a catalyst and a polycondensation reaction is carried out to yield a polyester.

Solid state polymerization can also be utilized, if crystallizable copolymers having high melting points are made. In this process, a melt polycondensation is carried out as described above until generally the intrinsic viscosity of the polymer melt reaches about 0.2 or higher, for example, up to about 0.6. At this point, the solution melt is cooled to produce a solid which is then pelletized, chopped, etc. The pellets are then subjected to a solid state polymerization wherein a vacuum is applied at a temperature below the melting point of the partially formed polymer. Thus, the polymer is actually polymerized in a solid state, with the polycondensation reaction being continued in such a state. Generally, the solid state polymerization is continued until the intrinsic viscosity of the polymer reaches any desirable level, such as from about 0.60 to about 1.0, or even higher. Desirably, the intrinsic viscosity ranges from about 0.70 to about 0.90. The units are deciliters/gram using a 60/40 phenol/tetrachloroethane solution at 25° C. Generally, pure PEI cannot be solid state polymerized due to its essentially amorphous character.

In the prior art, catalysts were often utilized both for the esterification or transesterification and the polycondensation steps. Cyclic dimer has been observed to occur in both steps using conventional metallic catalysts such as compounds of antimony, titanium, manganese, germanium, and the like. The use of protonic acids as catalysts, however, has been found to effectively catalyze the reaction, yet does not result in the formation of large amounts of cyclic dimer.

Inorganic acids which have utility as polymerization catalysts include sulfuric, phosphoric, sulfurous, sulfamic, that is $HNH_2SO_3$, and the like. Organic acids which may be used include trichloroacetic, dichloroacetic, p-toluene sulfonic, and the like. Generally, the amount of acid utilized is often dependent upon two variables, namely, the acids's disassociation constant, abbreviated $pK_a$ and its volatility.

In theory, any protonic acid could be used as an esterification or polycondensation catalyst, however, as a practical matter, acids are used having a $pK_a$ of about 2.5 or less and preferably about 2.0 or less. Also, acids which do not volatilize to an appreciable extent under the high vacuum and temperature conditions of the S/2 step described earlier are desired. The reason for this requirement is that a threshhold number of catalyst species must be present in the polycondensation step to reduce the amount of cyclic dimer. Thus, for example, acids having $pK_a$ values higher than about 2.5 are generally required in inconveniently large amounts. Further, highly volatile acids, which are lost during the high vacuum and high temperature stage, must be added in initially high concentrations to maintain the threshhold amount of acid during this second stage.

In this regard, it should be noted that a highly volatile acid, such as for example HCl, while normally not useful as a polymerization catalyst, may be utilized if loss of the acid is prevented during the polyesterification step. For example, the volatile acid may be complexed or encapsulated so that its apparent volatility is reduced. Further, the invention contemplates the use of large amounts of acids having $pK_a$'s above 2.5 if such large amounts do not have a detrimental effect on the polymer in its intended use.

Generally, the amount of acid which is utilized as a catalyst can vary from about 0.001 to about 3 weight percent based on the total weight of the polymer formed. The acids preferably used in an amount about 0.01 to about 1.0 weight percent with between about 0.05 and 0.5 being preferred. The actual amount of acid will of course vary depending on its particular $pK_a$ value and its volatility.

In prior art metal catalyzed processes, the amount of cyclic dimer formed from the reaction of ethylene glycol and isophthalic acid or an ester thereof is generally above 5 weight percent and may range up to 15 weight percent. Use of protonic acid catalysts on the other hand reduces the amount of cyclic dimer to below 5 percent by weight which is considered the maximum amount of cyclic dimer which can be tolerated in a useful polymer. Desirably, the dimer amount is 4.0 weight percent or less, and preferably 3.0 weight percent or less.

In addition to reducing the cyclic dimer content of polyethylene isophthalate homopolymer, a protonic acid catalyst of the invention can be utilized to the same end with various copolymers thereof. Generally, as the amount of isophthalic compound and/or ethylene glycol decreases as a mole percentage of the total monomer composition, the amount of ethylene isophthalate cyclic dimer also decreases, as would be expected. As seen from the examples given below, however, the protonic acid remains effective when used in copolymers to further decrease the amount of cyclic dimer. Moreover, when starting materials other than an isophthalic compound and ethylene glycol are used, undesirable by-products similar in detriment to ethylene isophthalate cyclic dimer may very well be formed, that is, it is highly probable that this dimer is not the only such cyclic oligomer which can be formed as a by-product of a polyesterification reaction. The use of the invention can result in reductions of other cyclic dimers, trimers and other cyclic oligomers which can form when copolymers of polyethylene isophthalate are made, or indeed when a polyester or copolymer is made containing no isophthalic and/or no ethylene glycol.

Although the protonic acid can be added at the S/1, S/2, or S/3 stage, in the present invention it is desirable that the protonic acid is added at the later stages since such tends to increase the glass transition temperature and reduce the flexibility of the polyester end product. Thus, desirably the protonic acid is added at the second stage and preferably at about S/2.6 to S/2.9. That is, just before the S/3 stage is reached. Addition towards the end portion of the second stage results in a reduced amount of diethylene glycol which inherently produced and tends to create a flexible polyester.

Although polyesters made in accordance as set forth above utilizing protonic acids have reduced cyclic dimer content, they generally have relatively low glass transition temperatures and thus yield rather flexible films. This is likely a result of formation of ethylene glycol dimer under acid condition and its incorporation into the polymer backbone. These polymers are unsuitable for rigid container manufacture. More rigid, higher glass transition temperature polymers can be produced with this catalyst system by late addition of the protonic acid and by utilizing relatively low initial ratios of ethylene glycol to dicarboxylic acid. However, under these conditions, relatively low molecular weight polymers (limiting I.V. of about 4) are obtained which result in brittle, low strength films and molded containers. It has been found that according to the present invention, such properties, including improved barrier resistance to oxygen and carbon dioxide, and high intrinsic viscosity, are improved through the addition of intrinsic viscosity modifying agents. Moreover, the flexibility of the polymers is greatly reduced so that products made therefrom have good rigidity. The amount of the intrinsic viscosity modifying agent utilized when it is a diol having from 2 to 5 carbon atoms is from about 5 to about 25 mole percent, and preferably from about 10 to about 20 mole percent based upon the amount of polymer formed. When the agent is a polyol, the amount is from about 0.01 to about 1.0 mole percent based upon the total amount of the polymer formed. When the polyol is a triol, the amount is from about 0.025 to about 0.8 and preferably from about 0.1 to about 0.6 mole percent. When the agent is a tetraol, the amount is from about 0.02 to about 0.2 and preferably from about 0.05 to about 0.15 mole percent, based upon the total amount of polymer formed.

As with the protonic acids, the intrinsic viscosity modifying agents are generally added at any stage, that is the S/1 stage, the S/2 stage, or the S/3 stage, with S/1 and S/2 stages being desired, and preferably at S/2.1 to S/2.8. Desirably, the intrinsic viscosity modifying agent is added after the initial esterification or transesterification has commenced. The intrinsic viscosity modifying agent can be a diol, preferably ethylene glycol. It can also be one or more compounds such as pentaerythritol, a preferred compound, glycidol, also a preferred compound, and compounds having the formula

wherein R' is a saturated aliphatic hydrocarbon radical containing from 3 to 6 carbon atoms and a is an integer from 3 to 6, compounds having the formula

wherein R' is a saturated aliphatic hydrocarbon radical containing from 1 to 6 carbon atoms and wherein b is an integer from 3 to 6, compounds having the formula

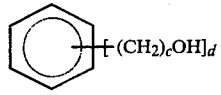

wherein c is an integer from 1 to 6 and d is an integer from 3 to 6, and compounds having the formula

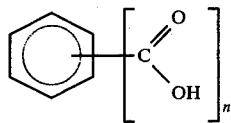

where n is an integer from 3 to 4.

Such agents can be added simultaneously with the protonic acid or separately. Addition of the acids at a late stage also tends to reduce flexibility of the polymer since production of diethylene glycol is reduced. Moreover, although the protonic acids such as sulfuric acid, and the like, can be utilized separately, they are desirably added in association with the polyol intrinsic viscosity modifying agents to obtain high I.V., high Tg and low dimer content polyesters.

Polymers so produced tend to have excellent clarity, high oxygen barrier properties, as well as high molecular weight. For example, when intrinsic viscosity modifying agents are utilized, oxygen permeabilities of less than 5.0 and often less than 2 cc/mil were produced. This result was quite unexpected since the intrinsic viscosity modifying agents are often branching or cross-linking agents and would normally yield branched or crosslinked polymers. The prior art does not teach improved barrier with increased branching. Permeability resistance was also found to be improved by adding the additive at a late stage, that is during the S/2 stage. Generally, the polyisophthalates according to the present invention exhibit oxygen permeabilities of less than 0.6 and preferably less than 5.0.

Moreover, the intrinsic viscosity was increased such that it was generally above 0.45, desirably above 0.5, and preferably or often above 0.6 dl/g. in a 60/40 phenol/tetrachloroethane solution. The polymer of the present invention can be utilized as a layer in a multilayer article, e.g., a container, bottle, etc., as set forth in a copending application filed simultaneously herewith, bearing U.S. Ser. No. 415,306. Such increase in molecular weight is important since it imparts various properties such as tensile strength, toughness and impact strength. Still another result obtained utilizing the chain-extending agent was an increase in glass transition temperature. Thus, polymers exhibiting glass transition temperatures of 45° C. or greater, and preferably 50° C. or greater are readily produced.

The polyesters of the present invention can contain conventional additives in conventional amounts such as various stabilizers, colorants, and the like.

During the esterification or transesterification step, conventional temperatures can be utilized such as from about 180° C. up to about 300° C. The condensation step is carried out at temperatures ranging from about 220° C. to about 280° C. under a high vacuum, that is generally less than 1 millimeter of mercury and preferably less than 0.5 millimeters of mercury.

The polyisophthalates or copolymers thereof made according to this invention which have low cyclic dimer content are particularly suitable for use as packaging material, made in the form of a molded container, a film, or the like. They thus find suitable use as molded containers possessing a clarity heretofore unattainable in polyisophthalate polyesters and which can be filled with comestibles, for example, food stuffs, as containers which can be blow-molded and used for carbonated beverages, for example, soft drinks, various juice drinks, for example, orange juice, grape juice, etc., as medicine bottles, or as films to envelop various items, i.e., wrap, such as meat, groceries, and the like. A particular use is in the form of containers for various alcoholic beverages such as beer, wine, liquor and the like. The polyisophthalates or copolymers thereof can also be utilized as a layer in a multilayer article, e.g., a container, bottle, etc., as set forth in a copending application filed simultaneously herewith bearing U.S. Ser. No. 415,306. The storage or bottling of these items is particularly suitable utilizing the packaging material of the present invention due to its relatively low permeability with regard to oxygen and carbon dioxide.

Because of the above-mentioned lower glass transition temperature, PEI and copolymers thereof can be processed at lower temperatures, that is, generally less than 500° F. and often less than 450° F. versus 540° F. for the processing of poly(ethylene terephthalate) as in forming a parison for making a bottle, has several advantages. Lower processing temperatures result in less side reaction of the polyester resin resulting in undesirable by-products, such as linear and cyclic oligomers and particularly acetaldehyde. PET containers having small quantities of acetaldehyde impart an undesirable taste to food stuffs. So, the flavor of liquor, wine, and beer is particularly affected. Lower processing temperatures have the additional advantages of lower processing costs due to lower energy consumption. Moreover, the PEI or copolymers thereof, when used as packaging materials such as for beverage containers, have relatively good properties, approaching those of PET, and also have good melt strength. Hence, it can be readily blow-molded. Although PEI and copolymers thereof are largely amorphous, they exhibit properties approaching that of PET when they are oriented in both directions, that is, biaxially oriented. Such orientation is well known to the art and can be achieved in any of several methods, for example as through biaxially blow-molding, commonly used in formation of bottles, and other containers, as well as biaxial orientation currently utilized in the formation of films. In addition to stronger tensile strength imparted to the packaging material by orientation, it also imparts a flexibility to the material.

The invention will be better understood by the following examples which illustrate the preparation of low cyclic dimer polyisophthalate and copolymers using the catalysts described above. In the examples and tables which follow, the following definition of terms will apply:

I.V. is intrinsic viscosity measured at 30° C. using a solution of polymer dissolved in a mixture of 3 weight parts of phenol and 2 weight parts of tetrachloroethane.

Tg is the glass transition temperature in °C. of amorphous samples measured with a Differential Scanning Calorimeter.

$O_2$ is the oxygen permeability measured on an Ox-Tran 100 instrument and reported in cc·mil/100 in-$^2$·day·atm.

Cyclic dimer is the weight percent of ethylene isophthalate ring dimer present in the polymer as determined by gel permeation chromatography.

The compositions listed in the tables are molar percentages based on feed stock, unless otherwise noted.

EXAMPLE 1

A stainless steel reactor was charged with 13.0 pounds of isophthalic acid and 7.3 pounds of ethylene glycol. This mixture was heated from 188° to 209° C. under a nitrogen atmosphere over a four to five hour period during which a total of 1170 milliliters of water distilled from the reaction mixture. The mixture was then transferred to a stainless steel polymerization vessel. The reaction temperature was held constant at about 220° C. over the next hour during which the pressure in the system was gradually reduced to about 1 millimeter mercury. Additional water and ethylene glycol was removed. The reactor was then rapidly restored to atmospheric pressure with nitrogen gas and 47.6 grams of a catalyst solution (5 weight percent $H_2SO_4$ in ethylene glycol) was added. The reaction temperature was then raised to about 240° C. and the pressure in the system again reduced to about 1 millimeter mercury over the next hour. During the next two to three hours, the temperature was gradually raised from 240° to about 265° C. The reactor was then restored to atmospheric pressure using nitrogen gas and the polymer extruded and pelletized. This polymer had a relatively low intrinsic viscosity of 0.35. Polymer properties are given in Table I.

EXAMPLES 2 AND 3

Following the general procedure of Example 1, poly(ethylene isophthalate) was prepared using a sulfuric acid catalyst and a similar 1.5/1 initial EG/IPA molar charge ratio. In these examples, additional EG was added to the reaction at the start of the polycondensation reaction (S/2.1). In Example 2, 1.5 pounds was added and in Example 3, 2.5 pounds was added. The polymers obtained in these reactions exhibited significantly higher intrinsic viscosities (0.57 and 0.64) compared to that of the polymer produced in Example 1. Both polymers exhibited high Tg's and low cyclic dimer contents. Polymer properties are shown in Table I.

EXAMPLES 4 THROUGH 8

Following the general procedure of Example 1, poly(ethylene isophthalate) was prepared using sulfuric acid catalyst and an initial EG/IPA molar charge ratio of 1.2/1. In Example 4, no additional additives were used and the resulting polymer intrinsic viscosity was quite low (0.21). In Examples 5 through 8, varying levels of ethylene glycol (EG) and pentaerythritol (PE) were added at various stages of the reaction to produce significantly higher molecular weight polymers. The amount of additive utilized and the time of addition are shown in Table I along with the polymer properties. All of these polymers exhibited high Tg's, low cyclic dimer contents and very low oxygen permeability values. The polymer in Example 8, which utilized simultaneous addition of EG and PE, exhibited an exceptionally low oxygen permeability.

TABLE I

| PREPARATION AND PROPERTIES OF HIGH BARRIER PEI CATALYZED BY $H_2SO_4$ | | | | | | | |
|---|---|---|---|---|---|---|---|
| | | | | POLYMER PROPERTIES | | | |
| | EG/IPA | ADDITIVE | | | Tg | Cyclic | Oxygen |
| EXAMPLE | (MOLAR CHANGE)[a] | TYPE (AMOUNT)[b] | TIME[c] | I.V. | (°C.) | Dimer (Wt. %) | Permeability[d] |
| 1 | 1.5/1 | none | — | 0.35 | 55 | approx. 2-3 | — |
| 2 | 1.5/1 | EG(1.5 lb) | S/2.1 | 0.57 | 47 | 2.4 | 5.0 |
| 3 | 1.5/1 | EG(2.5 lb) | S/2.1 | 0.64 | 51 | — | — |
| 4 | 1.2/1 | none | — | 0.21 | — | approx. 2-3 | — |
| 5 | 1.2/1 | PE(0.5 ppt) | S/1.1 | 0.62 | 54 | — | 4.4 |
| | | EG(1.5 lb) | S/2.1 | | | | |
| 6 | 1.2/1 | PE(0.5 ppt) | S/1.1 | 0.71 | 57 | 2.1 | 4.1 |
| | | EG(2.5 lb) | S/2.1 | | | | |
| 7 | 1.2/1 | PE(1.0 ppt) | S/1.1 | 0.69 | 57 | 2.1 | 3.8 |
| | | EG(1.5 lb) | S/2.1 | | | | |
| 8 | 1.2/1 | PE(0.5 ppt) | S/2.1 | 0.67 | 54 | 2.2 | 2.0 |
| | | EG(1.5 lb) | S/2.1 | | | | |

[a] = Reactant charge at start of esterification reaction
[b] = EG = ethylene glycol; PE = pentaerythritol; PPI = parts per thousand PE
[c] = Addition times at various stages of polymerization reaction:
S/1.1 = Start of esterification stage
S/2.1 = Start of polycondensation stage (after $H_2O$ removal) after transfer of reactants to polymerization vessel
[d] = Units: cc · mil/100 in $^2$ · day · atm

COMPARATIVE EXAMPLE 9

Following the procedure of Example 1, poly(ethylene isophthalate) was prepared using antimony trioxide ($Sb_2O_3$) as catalyst and an EG/IPA molar charge ratio of 1.2/1.

A polymer was obtained having a high intrinsic viscosity, but also very high levels of cyclic dimer as shown in Table II. This catalyst system is representative of the standard metallic catalysts typically used for polyesterification reactions. These systems give unacceptionably high levels of cyclic dimer.

COMPARATIVE EXAMPLES 10 AND 11

Following the procedure of Example 1, poly(ethylene isophthalate) was prepared using sulfuric acid catalyst, but with initial EG/IPA ratios of 2.5/1 and 2.0/1. High molecular weight polymers were obtained containing very low levels of cyclic dimer. However, these were relatively flexible polymers exhibiting Tg's of 19° and 29° C., respectively. These materials would not be suitable for packaging applications requiring rigid containers. Polymer data is given in Table II.

TABLE II

PROPERTIES OF PEI CATALYZED BY $Sb_2O_3$ OR $H_2SO_4$ (NO ADDITIVES)

| EXAMPLE | EG/IPA (MOLAR CHARGE) | CATALYST | I.V. | Tg (°C.) | POLYMER PROPERTIES CYCLIC DIMER (Wt. %) |
|---|---|---|---|---|---|
| 9 | 1.2/1 | $Sb_2O_3$ | 0.77 | 60 | 7–8 |
| 10 | 2.5/1 | $H_2SO_4^a$ | 0.76 | 19 | 0.8 |
| 11 | 2.0/1 | $H_2SO_4^a$ | 0.72 | 29 | 1.8 |

$a = H_2SO_4$ added at S/2.7 (see Table I)

EXAMPLE 12

A small glass reactor tube was charged with 60 grams of isophthalic acid and 29.1 grams of ethylene glycol. This mixture was heated under a nitrogen atmosphere from 180° to 225° C. over a four hour period during which water was distilled from the reaction. The temperature was then raised to about 240° C. and 0.25 milliliters of glycidol in 2 milliliters of ethylene glycol along with 0.3 grams of p-toluenesulfonic acid was added. After 15 minutes, the pressure of the reaction vessel was reduced to about 0.5 millimeters of mercury over a one hour period with ethylene glycol being distilled from the reaction. The temperature was then raised to about 270° C. over the next two hours and a polymer was obtained having an intrinsic viscosity of 0.54 and a cyclic dimer content of 3.3 weight percent. Using the same catalyst and reaction conditions, but excluding glycidol, gave a polymer having similar cyclic dimer content (3.9%) but a lower melt viscosity indicating a lower molecular weight.

While in accordance with the patent statutes, the best mode and preferred embodiment has been set forth, it will be apparent to those skilled in the art that the scope of the invention is limited by the appended claims.

What is claimed is:

1. A process for preparing polyisophthalate or a copolymer thereof having low amount of ring dimer of ethylene isophthalate, comprising the steps of:
   reacting an isophthalic compound with a glycol, said isophthalic compound selected from the group consisting of isophthalic acid, an alkyl ester of isophthalic acid having from 10 to 20 carbon atoms, and combinations thereof, said glycol being ethylene glycol and containing from 0 to 50 mole percent of one or more compounds selected from the group consisting of a glycol having from 3 to 12 carbon atoms, a glycol ether having from 4 to 12 carbon atoms, and combinations thereof;
   said copolymer being the reaction product of said isophthalic compound, said glycol, and up to 50 mole percent of a dicarboxylic acid or ester thereof having from 4 to 40 carbon atoms based upon said isophthalic compound and said dicarboxylic acid or said ester thereof, said dicarboxylic acid or ester thereof being other than said isophthalic compound;
   adding a protonic acid catalyst to said reaction; and
   adding an intrinsic viscosity modifying agent to said reaction to produce said isophthalic polymer or said copolymer thereof, having reduced cyclic dimer content.

2. A process according to claim 1, wherein the amount of said protonic acid ranges from about 0.001 to about 3 percent by weight based upon the total weight of said polymer or copolymer formed and, wherein the amount, based upon the polymer formed, of said intrinsic viscosity modifying agent ranges from about 5 mole percent to about 25 mole percent when said intrinsic viscosity modifying agent is a diol having from 2 to 5 carbon atoms, and from about 0.01 to about 1.0 mole percent when said intrinsic viscosity modifying agent is a polyol, and wherein the amount of said dimer is 5.0 weight percent or less.

3. A process according to claim 2, wherein the intrinsic viscosity of said polyisophthalate or said copolymer thereof is greater than 0.45 dl/g, wherein said protonic acid has a $pK_a$ of 2.5 or less, wherein said intrinsic viscosity modifying agent is a diol having from 2 to 5 carbon atoms, or is selected from the group consisting of glycidol, pentaerythritol, compounds having the formula $$R'(OH)_a$$

wherein
R' is a saturated aliphatic hydrocarbon radical containing from 3 to 6 carbon atoms and a is an integer from 3 to 6, compounds having the formula $$R'—(CH_2OH)_b$$

wherein
R' is a saturated aliphatic hydrocarbon radical containing from 1 to 6 carbon atoms and wherein b is an integer from 3 to 6, compounds having the formula

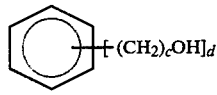

wherein
c is an integer from 1 to 6 and d is an integer from 3 to 6, compounds having the formula

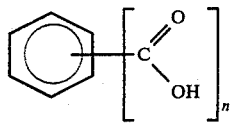

where
n is 3 or 4, and combinations thereof.

4. A process according to claim 3, wherein said isophthalic compound is selected from the group consisting of isophthalic acid, and an alkyl ester of isophthalic acid having from 10 to 16 carbon atoms, and combinations thereof,
  wherein said dicarboxylic acid is selected from the group consisting of an alkyl dicarboxylic acid having from 4 to 12 carbon atoms, an aryl or alkyl substituted aryl having from 8 or 9, respectively, to 16 carbon atoms, a dimer acid having from 34 to 40 carbon atoms, a diester of an alkyl dicarboxylic acid having from 6 to 20 carbon atoms, or an ester of an alkyl substituted aryl dicarboxylic acid having from 11 to 20 carbon atoms, an ester of an aryl dicarboxylic acid having from 10 to 20 carbon atoms, an alkali salt of sulfodialkyl isophthalate wherein said alkyl group has from 1 to 5 carbon atoms, and combinations thereof,
  wherein the amount of said dicarboxylic acid is from about 0 to about 30 mole percent, and
  wherein the amount of said diol other than said ethylene glycol is 40 mole percent or less, wherein said diol has from 3 to 10 carbon atoms, and wherein said glycol ether has from 4 to 8 carbon atoms.

5. A process according to claim 4, wherein said isophthalic compound is selected from the group consisting of isophthalic acid, dimethylisophthalate, and diethylisophthalate,
  wherein the amount of said dicarboxylic acid is 20 mole percent or less, wherein said dicarboxylic acid is terephthalic acid, dimethylterephthalate, or diethylterephthalate, and
  wherein said diol other than said ethylene glycol is a glycol having from 3 to 8 carbon atoms and wherein said glycol amount is 30 mole percent or less.

6. A process according to claim 5, wherein the glass transition temperature of said polyisophthalate or said copolymer thereof is 45° C. or greater, wherein the intrinsic viscosity is 0.5 dl/g or greater, and wherein the oxygen permeability is 6.0 cc·mil/100 in$^2$·day·atm or less.

7. A process according to claim 6, wherein said protonic acid and said intrinsic viscosity modifying agent is added at the S/2 stage of the reaction, wherein the amount of said cyclic dimer is 4.0 weight percent or less, wherein said intrinsic viscosity is 0.6 dl/g or greater, and wherein said glass transition temperature is 50° C. or greater.

8. A process according to claim 7, wherein said isophthalic compound is isophthalic acid, wherein said diol is ethylene glycol, and wherein said dicarboxylic acid is terephthalic acid.

9. A process according to claims 1, 4, 5, 6, or 8, wherein said protonic acid is selected from the group consisting of sulfuric acid, phosphoric acid, p-toluene sulfonic acid, sulfuorous acid, sulfamic acid, trichloroacetic acid, and combinations thereof, and wherein said intrinsic viscosity modifying agent is selected from the group consisting of ethylene glycol, pentaerythritol, glycidol, or combinations thereof.

10. A process according to claim 9, wherein the amount of said protonic acid is from about 0.01 to about 1.0 weight percent, and wherein the amount of said diol intrinsic viscosity modifying agent is from about 10 to about 25 mole percent, and wherein the amount of said triol agent is from about 0.025 to about 0.80 mole percent, and wherein said tetraol agent is from about 0.02 to about 0.20 mole percent, based upon the total amount of polymer formed.

11. A process according to claim 10, wherein said polyisophthalate or copolymer thereof is made into a container.

12. A process according to claim 11, wherein said container is a bottle.

13. A polyisophthalate or copolymer thereof having a low content of ring dimer of ethylene isophthalate, comprising:
  the polyisophthalate being the reaction product of an isophthalic compound and a diol having from 2 to 12 carbon atoms, said isophthalic compound selected from the group consisting of isophthalic acid, an alkyl ester of isophthalic acid having from 10 to 20 carbon atoms, and combinations thereof, said diol being ethylene glycol and containing from 0 to 50 mole percent of one or more compounds selected from the group consisting of a glycol having from 3 to 12 carbon atoms, a glycol ether having from 4 to 12 carbon atoms, and combinations thereof;
  said copolymer being the reaction product of said isophthalic compound, said diol, and up to 50 mole percent of a dicarboxylic acid or ester thereof having from 4 to 40 carbon atoms based upon said isophthalic compound and said dicarboxylic acid or said ester thereof, said dicarboxylic acid or ester thereof being other than said isophthalic compound;
  said polyisophthalate or copolymer formed in the presence of a protonic acid catalyst having a p$K_a$ of 2.5 or less; and
  an intrinsic viscosity modifying agent so that said isophthalic polymer or said copolymer thereof has a dimer content of 5 weight percent or less.

14. A polyisophthalate or a copolymer thereof, according to claim 13, wherein the amount of said protonic acid ranges from about 0.001 percent to about 3 percent by weight, based upon the total weight of said polymer or copolymer formed and, wherein the amount, based upon the polymer formed, of said intrinsic viscosity modifying agent ranges from about 5 mole percent to about 25 mole percent when said intrinsic viscosity modifying agent is a diol having from 2 to 5 carbon atoms, and from about 0.01 to about 1.0 mole percent when said intrinsic viscosity modifying agent is a polyol.

15. A polyisophthalate or copolymer thereof according to claim 14, wherein the intrinsic viscosity of said polyisophthalate or said copolymer thereof is greater than 0.45 dl/g, wherein said protonic acid has a p$K_a$ of 2.5 or less, wherein said intrinsic viscosity modifying agent is a diol having from 2 to 5 carbon atoms, or is selected from the group consisting of glycidol, pentaerythritol, compounds having the formula

wherein
  R' is a saturated aliphatic hydrocarbon radical containing from 3 to 6 carbon atoms and a is an integer from 3 to 6, compounds having the formula

wherein
  R' is a saturated aliphatic hydrocarbon radical containing from 1 to 6 carbon atoms and wherein b is an integer from 3 to 6, compounds having the formula

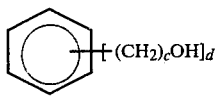

wherein
c is an integer from 1 to 6 and d is an integer from 3 to 6, compounds having the formula

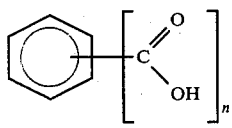

where
n is 3 or 4, and combinations thereof.

16. A polyisophthalate or copolymer thereof according to claim 15, wherein said isophthalic compound is selected from the group consisting of isophthalic acid, an alkyl ester of isophthalic acid having from 10 to 16 carbon atoms,
wherein said dicarboxylic acid is selected from the group consisting of an alkyl dicarboxylic acid having from 4 to 12 carbon atoms, an aryl or alkyl substituted aryl having from 8 to 9, respectively, to 16 carbon atoms, a dimer acid having from 34 to 40 carbon atoms, an ester of an alkyl dicarboxylic acid having from 6 to 20 carbon atoms, an ester of an alkyl substituted aryl dicarboxylic acid having 11 to 20 carbon atoms, an ester of an aryl dicarboxylic acid having from 10 to 20 carbon atoms, an alkali salt of sulfodialkyl isophthalate wherein said alkyl group has from 1 to 5 carbon atoms, and combinations thereof,
wherein the amount of said dicarboxylic acid or ester thereof is from about 0 to about 30 mole percent, and
wherein the amount of said diol other than said ethylene glycol is 40 mole percent or less, wherein said diol has from 3 to 10 carbon atoms, and wherein said glycol ether has from 4 to 8 carbon atoms.

17. A polyisophthalate or copolymer thereof according to claim 16, wherein said isophthalic compound is selected from the group consisting of isophthalic acid, dimethylisophthalate, and diethylisophthalate,
wherein the amount of said dicarboxylic acid is 20 mole percent or less, wherein said dicarboxylic acid is terephthalic acid, dimethylterephthalate, or diethylterephthalate, and
wherein said diol other than said ethylene glycol is a glycol having from 3 to 8 carbon atoms and wherein said glycol amount is 30 mole percent or less.

18. A polyisophthalate or copolymer thereof according to claim 17, wherein the glass transition temperature of said polyisophthalate or said copolymer thereof ranges from about 45° C. or greater, wherein the intrinsic viscosity range is 0.5 dl/g or greater, and wherein the oxygen permeability is 6.0 cc·mil/100 in².day·atm or less.

19. A polyisophthalate or copolymer thereof according to claim 18, wherein said cyclic dimer content is less than 4 weight percent.

20. A polyisophthalate or copolymer thereof according to claim 19, wherein said protonic acid and said intrinsic viscosity modifying agent is added to the S/2 stage of the reaction, wherein said intrinsic viscosity is 0.6 dl/g or greater, and wherein said glass transition temperature is 50° C. or greater.

21. A polyisophthalate or copolymer thereof according to claim 20, wherein said isophthalic compound is isophthalic acid, wherein said glycol is ethylene glycol, and wherein said dicarboxylic acid is terephthalic acid.

22. A polyisophthalate or copolymer thereof according to claim 13, 16, 17, 20, or 21, wherein said protonic acid is selected from the group consisting of sulfuric acid, phosphoric acid, p-toluenesulfonic acid, sulfurous acid, sulfamic acid, and trichloroacetic acid, and combinations thereof, and wherein said viscosity modifying agent is selected from the group consisting of ethylene glycol, pentaerythritol, glycidol, or combinations thereof.

23. A polyisophthalate or copolymer thereof according to claim 22, wherein the amount of said protonic acid is from about 0.01 to about 1.0 weight percent, and wherein the amount of said diol intrinsic viscosity modifying agent is from about 10 to about 25 mole percent, and wherein the amount of said triol agent is from about 0.025 to about 0.80 mole percent, and wherein said tetraol agent is from about 0.02 to mole percent, based upon the total amount of polymer formed.

24. A polyisophthalate or copolymer thereof according to claim 23, wherein said polyisophthalate or copolymer thereof is in the form of a container.

25. A polyisophthalate or copolymer thereof according to claim 24, wherein said container is in the form of a bottle.

* * * * *